(12) United States Patent
Mukogawa

(10) Patent No.: US 7,191,152 B1
(45) Date of Patent: Mar. 13, 2007

(54) AUTOMATED FINANCIAL TRANSACTION SYSTEM

(75) Inventor: Satoshi Mukogawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/447,658

(22) Filed: Nov. 23, 1999

(30) Foreign Application Priority Data

Jun. 21, 1999 (JP) .................................. 11-173901

(51) Int. Cl.
*G06Q 40/00* (2006.01)

(52) U.S. Cl. .............................. 705/43; 705/40; 705/41; 705/42; 705/43; 705/44; 235/379; 235/380; 235/381; 235/382; 709/206

(58) Field of Classification Search .................. 705/40, 705/41, 42, 43, 44; 235/379, 380, 381, 382; 709/206
See application file for complete search history.

(56) References Cited

U.S. PATENT DOCUMENTS 5,265,033 A * 11/1993 Vajk et al. .................. 709/206
6,085,177 A * 7/2000 Semple et al. ................. 705/43

* cited by examiner

*Primary Examiner*—Nga Nguyen
(74) *Attorney, Agent, or Firm*—Staas & Halsey LLP

(57) ABSTRACT

In an automated financial transaction system, a plurality of automated tellers machines (ATMs) have each a message input section and are each communicatably connected with a message depository via a public communications network. When a customer inputs at an ATM a message to a remittance destination during a remittance transaction, the ATM sends the message to the message depository via a public communications network for storage and also sends remittance information and depository information of the message to a management apparatus via an exclusive line. At the ATM, it is possible to send from the remittance source to a remittance destination a message including image data and voice data, which data amount is large, and also to send a message, which includes image data and voice data, to another remittance destination associated with another management apparatus whose electronic transaction format is different from that to be used in the first-named management apparatus. Meanwhile, at the remittance destination, it is possible to send or receive a message without restriction of site, time, terminal, etc., giving an improved convenience to customers.

41 Claims, 7 Drawing Sheets

FIG. 8

```
                                    ⟋34
┌─────────────────────────────────────┐
│                                     │
│   THERE IS REMITTANCE MESSAGE       │
│                                     │
│   FROM Mr/Ms _____ .               │
│                                     │
│   DO YOU RECEIVE MESSAGE?           │
│                                     │
│                          ┌───────┐  │
│                          │  YES  │  │
│                          └───────┘  │
│                          ┌───────┐  │
│                          │  NO   │  │
│                          └───────┘  │
└─────────────────────────────────────┘
```

AUTOMATED FINANCIAL TRANSACTION SYSTEM

BACKGROUND OF THE INVENTION

1. Field of the Invention

The present invention relates to an automated financial transaction system comprising a plurality of automated tellers machines (ATMs), responsive to operations of customers, for performing various transactions and a host computer, communicatably connected with the ATMs via exclusive lines, for managing the transactions, and more particularly to such an automated financial transaction system useful when used in remittance transactions in financial institutions and the like.

2. Description of the Related Art

In conventional automated financial transaction systems of financial institutions or other similar organizations, to make a remittance transaction for a particular remittance destination using an automated tellers machine (ATM), the applicant for remittance (remittance source) inputs, as the common practice, information about the remittance source by inputting, in addition to information about the remittance destination, the name and telephone number of the applicant from an operation panel or other device of the ATM, or by using a remittance pass, which was in advance created by registering the foregoing necessary information.

Meanwhile, an accounting host computer (management apparatus) performs the remittance procedure in accordance with the information input from the remittance-source ATM and sends the remittance-source information input in the above-mentioned manner, and also prints the name of the applicant and other necessary information on a passbook or the like of remittance destination. And at the remittance destination, the remittance source is identified based on the information (e.g., the applicant's name) about the remittance source.

In an attempt to minimize the remittance-destination customer's labor when identifying the remittance source, demands have arisen to add a message for the remittance destination to the remittance information during a remittance transaction.

For example, Japanese Patent Laid-Open Publication No. SHO 61-153762 discloses a technique of inputting a message from a keyboard during the remittance procedure at an ATM. And Japanese Patent Laid-Open Publication No. HEI 10-91841 discloses a more specific technique of indicating on the display of an ATM a plurality of predetermined fixed sentences for selection by the applicant for remittance and printing the selected sentence along with the above-mentioned necessary information (applicant's name, telephone number, etc.) on the remittance-destination customer's passbook, for example. Thanks to these prior art techniques, the convenience of the remittance-destination customer and the applicant for remittance as well has been improved as a message other than the usual necessary information (such as the applicant's name and telephone number) is notified from the applicant for remittance (remittance source) to the remittance destination.

However, according to the foregoing techniques of sending a message in characters such as fixed sentences for the remittance destination, since the message to be sent is composed of only characters and symbols, communication between the applicant for remittance (remittance source) and the remittance-destination customer would be restricted. For the same reason, even when the remittance-destination customer identifies the remittance source, the remittance-destination customer has to presume the remittance source from the applicant's name printed on a passbook or a slip and the contents of the message and hence cannot identify the person or party who actually made the remittance transaction.

As a solution, Japanese Patent Laid-Open Publication No. HEI 9-218971 discloses another technique of improving the convenience during the remittance transaction by having the applicant for remittance input a message for the remittance destination in type character, handwritten character/hand-drawn image, etc. using an input pen, sending to a host computer the remittance information with the input message added as text data and/or image data, and printing the message on a slip or a passbook of the remittance destination.

As another solution, Japanese Patent Laid-Open Publication No. HEI 7-319975 discloses still another technique of having the applicant for remittance input a message (image, voice) for the remittance destination from a camera and/or a voice input section of the remittance-source ATM, storing in an accounting host computer the image and/or voice message from the remittance source together with the information about the remittance source, then sending the message stored in the accounting host computer to an ATM in the form of communicating data when the remittance-destination customer has access to the message from the last-named ATM, and finally inputting the received message from an output device of the last-named ATM.

In the above-mentioned conventional automated financial transaction systems, according to the techniques of sending and receiving image and voice as a message for the remittance source as disclosed in Japanese Patent Laid-Open Publications Nos. HEI 9-218971 and HEI 7-319975, since the image and/or voice message is temporarily registered in the accounting host computer as communicating data, whose amount would usually be huge as compared to text data, the accounting host computer must have storage areas for storing a large amount of message data or the communication line to connect between the ATM and the accounting host computer requires a high-speed communication line that can afford to send and receive huge data. Accordingly, to put these known techniques into practice, all of the existing information infrastructure have to be reconstructed; which would necessitate a vast investment for installation and hence would not be realistic.

Further, since the individual accounting host computer usually has a different electronic transaction format for every financial institution, the electronic transaction format has to be changed. At that time, although text data of the remittance information can be changed at high speed because its relatively less data amount, it would take very long time to change the format of image and/or voice data so that sending of a message containing image and/or voice data would be substantially impossible.

SUMMARY OF THE INVENTION

With the foregoing problems in view, it is an object of the present invention to provide an automated financial transaction system in which message sending and receiving routes and a message depositary site are improved such that at an automated tellers machine it is possible to send from the remittance source to the remittance destination a message including image data and/or voice data, which data amount is large, and also to send such message to another remittance destination associated with another management apparatus whose electronic transaction format is different from that to be used in the first-named management apparatus, and meanwhile, at the remittance destination, it is possible to send or receive the message without restriction of site, time, terminal, etc., giving an improved convenience to customers.

According to the present invention, there is provided an automated financial transaction system comprising: a plurality of automated tellers machines (ATM), responsive to operations by customers, for performing various transactions; and a management apparatus, communicatably connected with each of the ATMs via an exclusive line, for managing the transactions; the ATMs including a first ATM having a message input section for inputting a message for a remittance destination during remittance transaction, and the first ATM being operable to send the message to a message depository via a public communications network for storage; the first ATM being also operable to send remittance information and depository information about where the message is stored to the management apparatus via the exclusive line for management purposes.

As a preferable feature of the present invention, an information terminal is communicatably connected with the first ATM via the public communications network such that the first ATM notifies the information terminal of the depository information via the public communications network.

As another preferable feature, an information terminal may be communicatably connected with the management apparatus via the public communications network such that the management apparatus notifies the information terminal of the depository information via the public communications network.

As still another preferable feature, when the notification of the depository information is recognized by a remittance-destination customer at the information terminal, the information terminal is responsive to a request of the remittance-destination customer to read from the message depository the message from a remittance source, based on the notified depository information, and to reproduce the message at the information terminal.

As a further preferable feature, the ATMs include a second ATM communicatably connected with the message depository via the public communications network and having a message reproducing section for reproducing the message from the remittance source which message is stored in the message depository. When the message from the remittance source is recognized by the remittance-destination customer at the second ATM, the second ATM reads from the message depository the message from the remittance source, based on the depository information obtained from the management apparatus, and reproduces the message on the message reproducing section.

According to a still further preferable feature, the ATMs including a second ATM, wherein when said message from the remittance source is recognized by the remittance-destination customer at said second ATM, said second ATM obtains from said management apparatus said depository information and prints said depository information on a slip addressed to the remittance-destination customer and notifies the remittance-destination customer of said depository information. Alternatively, the second ATM may print the depository information on a passbook of the remittance-destination customer and may notify the remittance-destination customer of the depository information.

As an additional preferable feature, the information terminal is communicatably connected with the message depository of each ATM via the public communications network and has a message reproducing function for reproducing the message from the remittance source which message is stored in the message depository, the information terminal being operable to read from the message depository the message from the remittance source, based on the notified depository information, and to reproduce the read message at the information terminal.

As a still additional feature, the information terminal is communicatably connected with the management apparatus via the public communications network and has a remittance transacting function and a message input function for inputting a message to the remittance destination during the remittance transaction. When a message to the remittance destination is inputted by the message input function of the information terminal in response to a customer's operation, the information terminal sends the message to the message depository via the public communications network for storage and also sends remittance information and depository information of the message to the management apparatus via the public communications network for management by the management apparatus.

As a further additional feature, if the remittance transaction made in the first ATM is for the remittance destination associated with another management apparatus which manages transactions in an electronic transaction format different from the electronic transaction format to be used by the first-named management apparatus, the first ATM sends the remittance information and the depository information of themessage to the first-named management apparatus via the exclusive line, whereupon the first-named management apparatus sends the remittance information and the depository information to the second-named management apparatus.

As still another preferable feature, the ATMs include a third ATM which is to be managed by the second-named management apparatus and which is communicatably connected with the message depository via the public communications network and which has a message reproducing section for reproducing the message from the remittance source which is stored in the message depository. And when the message from the remittance source is recognized by the remittance-destination customer at the third ATM, the third ATM may read from the message depository the message from the remittance source, based on the depository information obtained from the second-named management apparatus, for reproduction thereby.

Further, the message may include image data and/or voice data.

Moreover, the public communications network may be Internet. Alternatively the public communications network may include an intranet.

Additionally, the message depository may be a message server.

With the foregoing features of the automated financial transaction system, it is possible to guarantee the following advantageous results:

(1) Since the remittance-destination customer can receive a message from the remittance source at an information terminal connected with the message depository via a public communications network, the remittance-destination customer can receive the message with ease, thus reducing the remittance-destination customer's labor needed to recognize the contents of the message and causing an improved convenience as information communications can be smoothly carried out smoothly between the remittance-source customer and the remittance-destination customer.

(2) Since it is needless that the message from the remittance source be sent via an exclusive line or the message is stored in the management apparatus, even in the case where the message includes image data or voice data whose data amount is large, it would be free of affects to communications between the first ATM and the management apparatus, and it would be possible to use the existing exclusive lines and management apparatus without reconstruction, which is economical.

(3) Since the remittance-destination customer can aware of the input of the message from the remittance source without difficulties and can recognize the contents of the message from the information terminal, which is connected to the message depository via the public communications network, based on the depository information of the message, it would be possible to reproduce the remittance-destination customer's labor needed for recognition of the contents of the message from the remittance source and to make information communication between the remittance-source customer and the remittance-destination customer smoothly, thus causing an improved convenience.

(4) Since the remittance-destination customer can recognize the contents of the message from the remittance source with ease after recognized the notification of the depository information of the message, it is possible to reproduce the remittance-destination customer's labor needed for recognition of the message contents.

(5) Since the remittance-destination customer can read the message, based on the depository information of the message from the remittance source which is printed on a passbook or slip, at the information terminal communicatably connected with the message depository via the public communications network, even in the case where reading and reproducing of the message at the second ATM is not possible for any reason, the remittance-destination customer can recognize the contents of the message from the remittance source, thus reducing the remittance-destination customer's labor needed for recognition of the message contents and causing an improved convenience as smooth communication of information between the remittance-source customer and the remittance-destination customer would be possible.

(6) Since it is possible to reproduce the message from the remittance source without using any ATM, the remittance-destination customer can recognize the contents of the message from the remittance source with ease, which would cause an improved convenience.

(7) Partly since a remittance transaction can be carried out without using an ATM and partly since the message to the remittance destination can be input during the remittance transaction, it would be possible to improve the customer's convenience.

(8) Partly since the message from the remittance source can be sent also to a remittance destination associated with another management apparatus which manages the remittance transaction in a unique communicating data format different from that to be used in the first-named management apparatus and partly since even in such event, it is needless either to send the message via an exclusive line or to store the message in the first-named management apparatus, even in the case where the message includes image data and/or voice data whose data amount is large, it would be free of affects to communications of transaction information either on the exclusive line between the first ATM and the management apparatus or on the exclusive line between the first-named management apparatus and another management apparatus, and it would be possible to use the existing exclusive lines and management apparatus without reconstruction, which would be economical.

(9) Since the remittance-destination customer can recognize the remittance source by image and/or voice, it is possible to secure an improved convenience.

(10) The automated financial transaction system is simple in construction and would hence be economical.

(11) It would be possible to improve the secrecy of a message from the remittance source.

(12) Partly since the message depository can be realized with sure and partly since reliability in handling a message can be improved, it is possible to improve the reliability of the automated financial transaction system.

BRIEF DESCRIPTION OF THE DRAWINGS

FIG. 8 is a diagram showing an example of display on the screen of an ATM when a message to the remittance-destination customer is received.

DESCRIPTION OF THE PREFERRED EMBODIMENT

A preferred embodiment of the present invention will now be described in detail with reference to the accompanying drawings.

Figure 1:
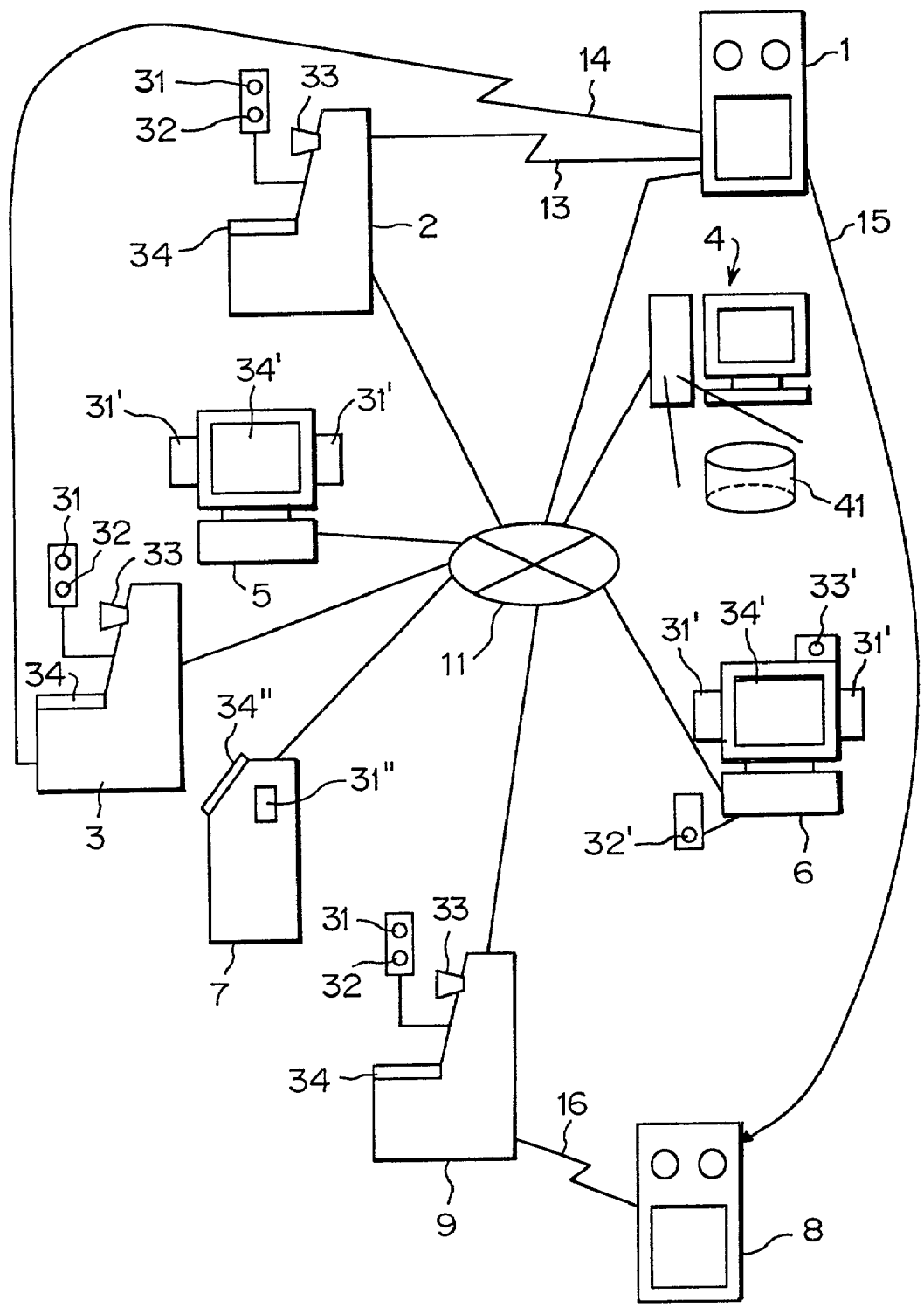
FIG. 1 is a block diagram showing an automated financial transaction system according to one aspect of the present invention.

FIG. 1 is a block diagram showing an automated financial transaction system (hereinafter called the system) according to one embodiment of the invention. The system, as shown in FIG. 1, comprises an accounting host computer (management apparatus) 1, a plurality of first automated tellers machines (first ATMs, only one shown) 2, a plurality of second automated tellers machines (second ATMs, only one shown) 3, a message server 4, a plurality of personal computers (information terminals, only one shown) 5, a plurality of personal computers (information terminals, only one shown) 6, a plurality of information terminals (each having a message reproducing function, only one terminal shown) 7, another accounting host computer (another management apparatus) 8, a plurality of third automated tellers machines (third ATMs, only one shown) 9, Internet/intranet (public communications network) 11, and exclusive lines 13–16.

The Internet/intranet 11 is a public communications network composed of interconnected local networks, including an intranet constructed as an internal information system of a certain organization using the Internet technology and Extranet composed of interconnected intranets.

An intranet is a public communication network constructed as an internal information system of a certain organization, for example, as an internal communications system of each financial institution which system is protected by a security technology, such as firewall, against accessing from outside by unauthorized parties.

Each of the first and second ATMs 2, 3 performs various kinds of financial transactions in response to operation of a customer.

The first ATM 2 is communicatably connected with the accounting host computer 1 via the exclusive line 13 for sending from an operating section of the first ATM 2 various transactions (such as remittance transactions) made by a customer or receiving various commands and data from the accounting host computer 1 for display on a display section (a below-described display 34).

The first ATM 2 includes a voice reproducing output section (message reproducing section) 31, a voice input section (message input section) 32, an image input section (message input section) 33, and a display (image reproducing output section, message reproducing section) 34.

The voice reproducing output section 31 outputs an instruction in voice from the first ATM 2 to a customer and reproduces a message (voice data) in voice from the remittance source, being in the form of a speaker, for example. The voice input section 32 inputs a message in voice of a customer (applicant for remittance) as voice data into the ATM, being in the form of a microphone. In the illustrated embodiment, the voice reproducing output section 31 and the voice input section 32 are a speaker and a microphone, respectively, of a handset.

The image input section 33 inputs a customer's message in image as image data into the first ATM 2, being in the form of a camera, a scanner, various input terminals, etc.

The display 34 is a monitor equipped with, for example, a touch sensor panel serving as a display section and an operating section of the first ATM 2 and also serving as an image reproducing output section which reproduces a message in the form of image data, as described below.

Further, the first ATM 2 is communicatably connected with Internet/intranet 11 via a LAN (local area network) board (not shown), etc. for sending to the message server 4, which is connected to Internet/intranet 11, a message (voice data and/or image data) to the remittance destination, which message is inputted by a customer (applicant for remittance) via the voice input section 32 and/or the image input section 33 during the remittance transaction as described below.

Moreover, at the first ATM 2, the remittance-destination customer can read and reproduce the message, which is stored in the message server 4, by inputting an address on Internet, for example, based on the depository information of the message printed on a slip or a passbook at the first ATM 2 or the third ATM 9.

In addition, during a remittance transaction made by a customer, the first ATM 2 sends to the accounting host computer via the exclusive line 13 remittance information about the remittance transaction customer and depository information of the message received from the message server 4.

The second ATM 3 also is communicatably connected with the accounting host computer 1 via the exclusive line 13 for performing various financial transactions in response to operations of customers. The second ATM 3 sends to the accounting host computer 1 the contents of various financial transactions (i.e., remittance procedures) made by the customer on the ATM 3, or receives various commands and data from the accounting host computer 1 for display on the display section.

Further, the second ATM 3 includes the voice reproducing output section (message reproducing section) 31, the voice input section (message input section) 32, the image input section 33 (message input section) 33, and the display (image reproducing output section, message reproducing section) 34, being identical in construction and operation with the above-described first ATM 2 except that it is devoid of the image input section 33.

The exclusive lines 13–16 are communications lines fixedly provided in specified sections. Specifically, the exclusive line 13 communicatably connects between the accounting host computer 1 and the first ATM 2; the exclusive line 14, between the second ATM 3 and the accounting host computer 1; the exclusive line 15, between the first-named accounting host computer 1 and the second-named accounting host computer 8; the exclusive line 16, between the second-named accounting host computer 8 and the third ATM 9.

The message server 4 is equipped with a hard disk 41 and is connected to Internet/intranet 11, being communicatably connected with the first, second and third ATMs 2, 3, 9, the personal computers 5, 6 and the information terminal 7 via this Internet/intranet 11.

When received messages respectively from the first, second and third ATMs 2, 3, 9 and the personal computer (described below) 6, the message server 4 keeps these messages in the hard disk 41 and also keeps messages inputted from the first, second and third ATMs 2, 3, 9 and the image input section 33 and voice input section 32 of the personal computer 6, thus playing as the message depository.

After stored a message in the hard disk 41, the message server 4 sends to the first, second and third ATMs 2, 3, 9, or the personal computer 6 depository information about a site (e.g., Internet address) where the message is stored.

The messages stored in the hard disk 41 can be read by the first, second and third ATMs 2, 3, 9, the personal computers 5, 6 and the information terminal 7, individually, via Internet/intranet 11. And these read messages can be reproduced at the first, second and third ATMs 2, 3, 9, the personal computers 5, 6 and the information terminal 7.

Further, these messages stored in the hard disk 41 can be deleted by the first, second and third ATMs 2, 3, 9, the personal computers 5, 6 and the information terminal 7.

The personal computer (information terminal) 5 is connected to Internet/intranet 11 via a LAN (local area network) board (not shown), etc. for receiving e-mail sent from, for example, the first, second and third ATMs 2, 3, 9 and the personal computer 6.

Further, the personal computer 5 has a function (e.g., a browser such as Internet Explorer® or Netscape Navigator®) of displaying images (still images and moving images) and also a function (speaker) of reproducing voice. The personal computer 5 therefore can read a message, which is stored in the message server 4, via Internet/intranet 11 and can reproduce the message.

The personal computer (information terminal) 6, like the personal computer 5, is connected to Internet/intranet 11 via a LAN board (not shown), etc. for receiving e-mail sent from, for example, the first, second and third ATMs 2, 3, 9 and the personal computer 5. And the personal computer 5 has a function (a speaker 31' and a display 34') of reproducing image and voice.

Further, the personal computer 6 is communicatably connected with the accounting host computer 1 via Internet/intranet 11 for performing various cashless financial transactions, such as remittance procedures and checking balance of account. And the personal computer 6 sends information about these financial transactions, which are made by customers, to the accounting host computer 1 via Internet/Internet 11 and receives various commands, data, etc., which are sent from the accounting host computer 1, for processing purposes.

As another feature, the personal computer 6 is equipped with a voice input section 32' and an image input section 33' for inputting a message in voice (voice data) using the voice input section 32' and a message in image (image data) using the image input section 33' during remittance procedure.

As still another feature, the personal computer 6 sends the message (voice data, image data) for the remittance destination, which message is input by the remittance-source customer (applicant for remittance) using the voice input section 32' and the image input section 33', to the message server 4, which is connected to the Internet/Internet 11. And the personal computer 6 receives depository information of the message sent from the message server 4.

Moreover, the personal computer 6 sends to the accounting host computer 1 via the exclusive line 13 information (remittance information) about the remittance transaction made by the customer and depository information sent from the message server 4.

The information terminal (information terminal having a message reproducing function) 7 is equipped with a speaker 31", a display 34" and a non-illustrated input device, such as a keyboard or a touch panel, and is connected to Internet/Internet 11 via a LAN board (not shown).

Further, the information terminal 7 has a function (e.g., a browser such as Internet Explorer® or Netscape Navigator®) of displaying images (including still images and moving images) and a function of reproducing voice by the speaker 31". Thus the information terminal 7 has a message reproducing function for reproducing a message from the remittance source, which message is stored in the message server 4, via Internet/Internet 11.

At the information terminal 7, the remittance-destination customer can read and reproduce the message, which is stored in the message server 4, by inputting an Internet address, for example, using the inputting device, based on the depository information printed on a slip or a passbook at the first, second or third ATMs 2, 3, 9. The information terminal 7 is installed in, for example, a convenience store or a station.

The second-named accounting host computer 8 also is communicatably connected with a plurality of ATMs each via an exclusive line and manages a customer's deposit account and transactions, such as checking balance of the account, at a financial institution other than the financial institution to which the first-named accounting host computer 1 belongs.

The second-named accounting host computer 8 manages transactions in a unique communicating data format different from that used in the first-named accounting host computer 1, serving as an alternative management apparatus. And the second-named accounting host computer 8 is communicatably connected with the third ATM 9 via the exclusive line 16 for managing various transactions made by a customer at the third ATM 9.

Further, between the second-named accounting host computer 8 and the first-named accounting host computer 1, transaction information (e.g., remittance information) and at lease depository information of the message can be sent to and received from each other via the exclusive line 15.

The third ATM 9, likewise the first and second ATMS 2, 3, performs various transactions in response to operations of a customer, and includes a voice reproducing output section (message reproducing section) 31, a voice input section (message input section) 32, an image input section (message input section 33), and a display (image reproducing output section, message reproducing section) 34.

Further, the third-named ATM 9 is communicatably connected with the second-named host computer 8 via the exclusive line 16 for sending contents of various transactions (e.g., remittance procedures), which are made by customers at the first-named ATM 9 and receiving various commands, data, etc. from the second-named accounting host computer 8.

In addition, the third-named ATM 9 is communicatably connected to Internet/Internet 11 via, for example, a LAN board (not shown) for having access to the message, which is stored in the message server 4, via Internet/Internet 11, based on the depository information of the message which information is received from the accounting host computer 8, and for reproducing the message.

In the illustrated embodiment, even when a customer makes a remittance transaction at the third ATM 9 for the remittance destination associated with the first-named accounting host computer 1, it is possible to input a message for the remittance destination through the voice input section 32 and/or the image input section 33 of the third ATM 9.

In such event, the messages input by customers at the third ATM 9 are stored in the message server 4 connected to Internet/Internet 11, another message server (not shown), etc., and the sites (e.g., Internet address) whether the messages are stored are notified to the third ATM 9 as depository information.

Then the third ATM 9 sends the depository information of these messages, along with remittance information, to the second-named accounting host computer 8. The second-named accounting host computer 8 manages the remittance information and the depository information of these messages together with the deposit accounts of the customers and the transaction information of the accounts.

The procedure in which, in the thus constructed automated financial transaction system, an applicant for remittance (customer) makes a remittance transaction for a remittance destination and the remittance-destination customer checks the remittance will now be described in detail as divided into the following items: (1) inputting a message at the first ATM 2, (2) inputting a message at the personal computer 6, (3) receiving and reproducing the message at the second ATM 3, (4) receiving and reproducing the message at the first-named personal computer 5, (5) receiving and reproducing the message at the second-named personal computer 6, (6) receiving and reproducing the message at the information terminal 7, and (7) receiving and reproducing the message at the third ATM 9.

Figure 2:
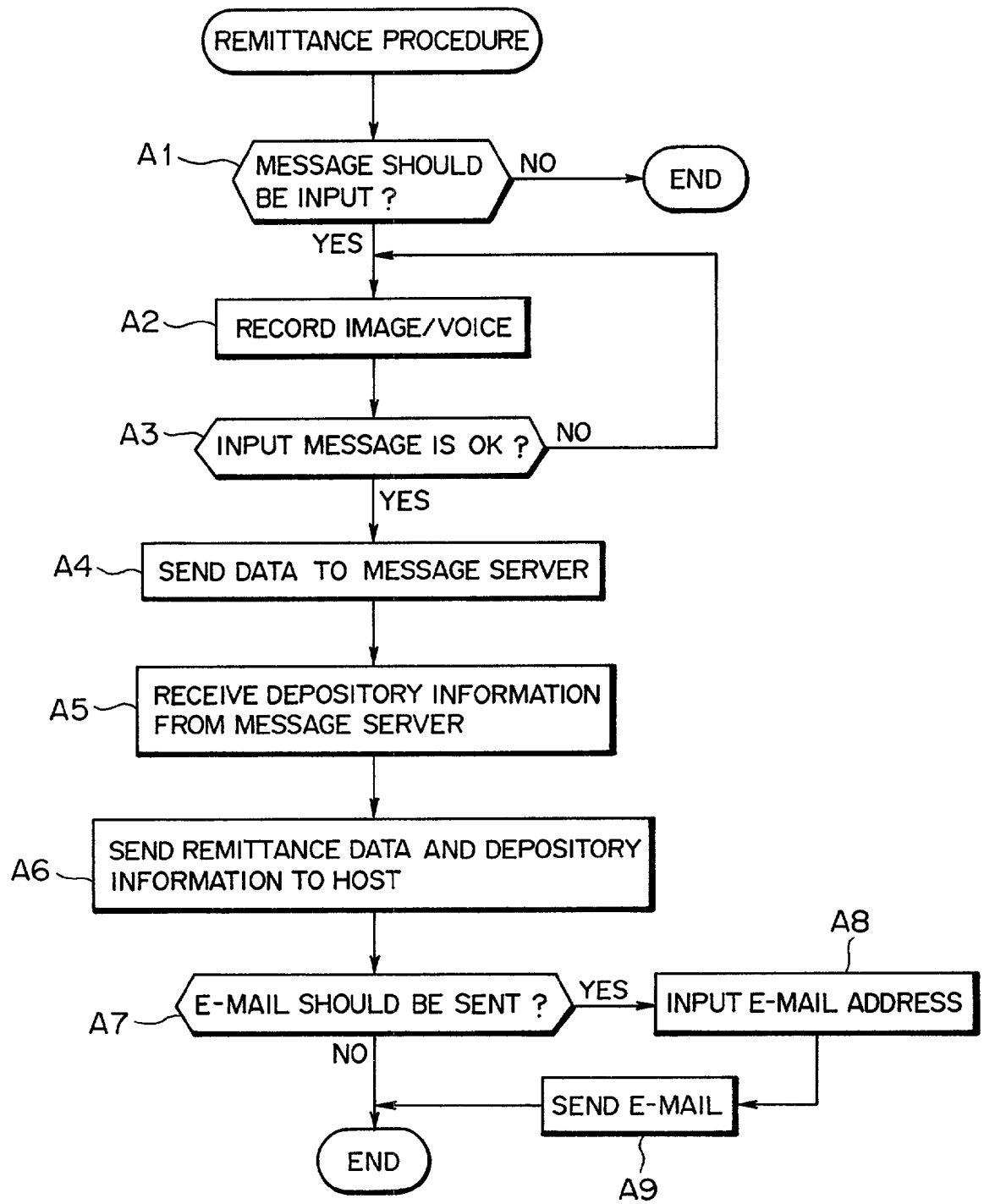
FIG. 2 is a flow diagram illustrating a succession of procedural steps for inputting and sending a message on an ATM of the present system.
Figure 3:
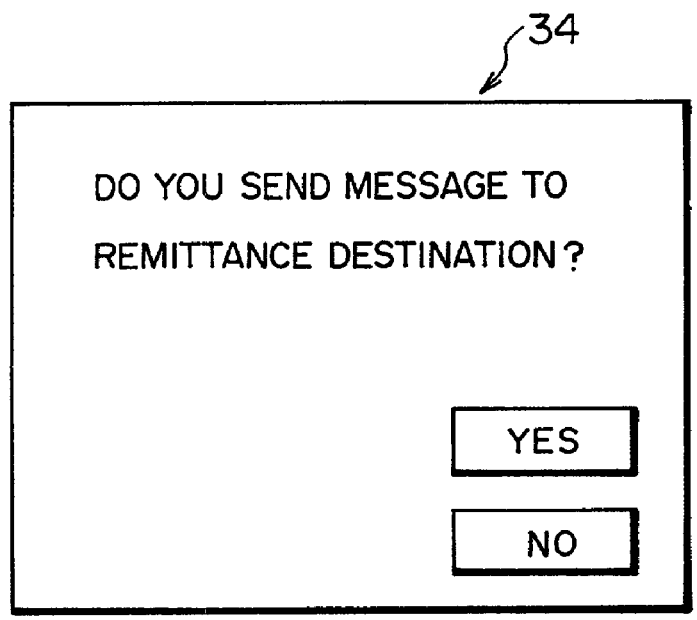
FIG. 3 is a diagram showing an example of display on the screen of an ATM from which it is conformed whether or not a message to the remittance-destination customer should be sent.
Figure 4:
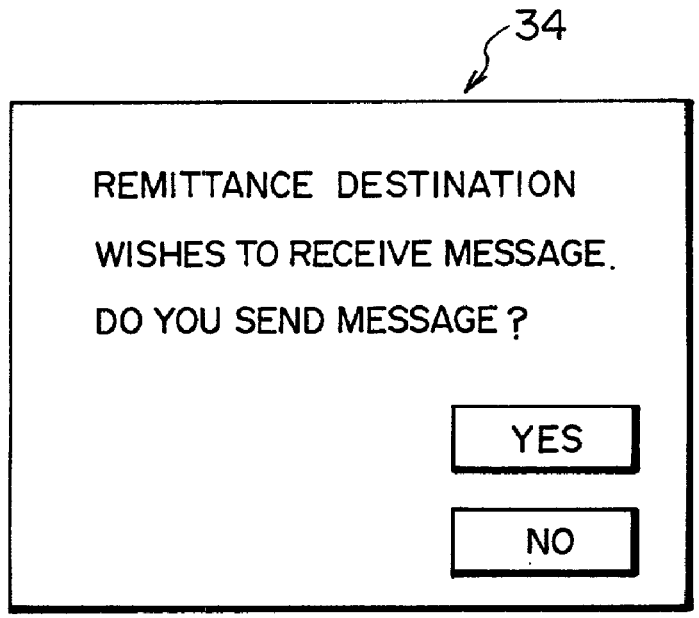
FIG. 4 is a diagram showing an example of display on the screen of an ATM when it is requested by the remittance-destination customer that a message should be sent to the customer.
Figure 5:
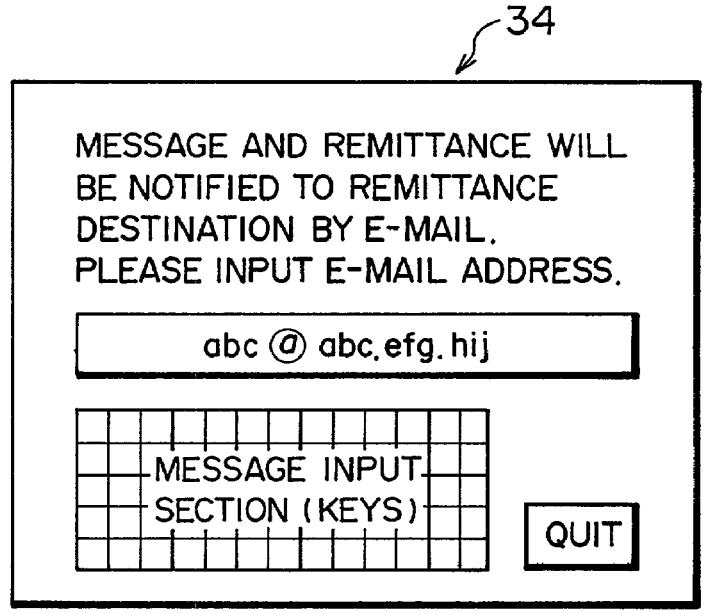
FIG. 5 is a diagram showing an example of display on the screen of an ATM when the e-mail address of the remittance-destination customer is inputted.
Figure 6:
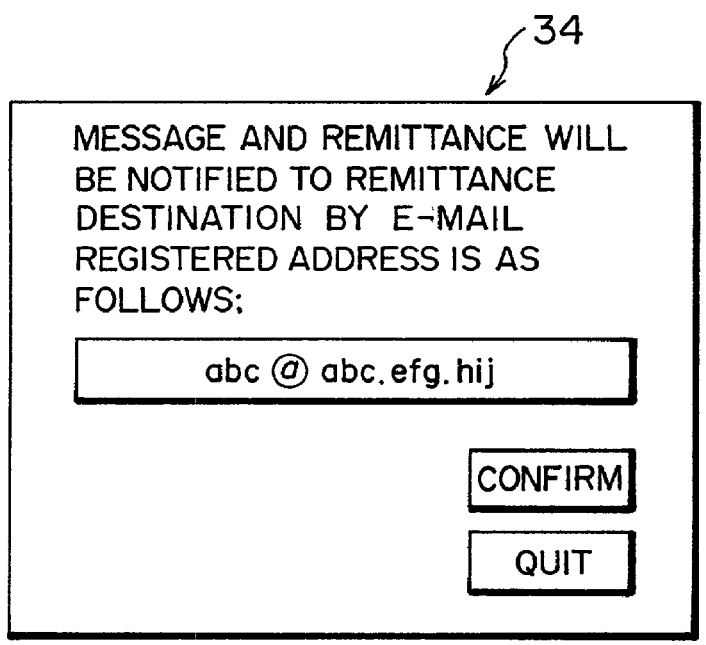
FIG. 6 is a diagram showing another example of display on the screen of an ATM when the e-mail address of the remittance-destination customer is input.

(1) Inputting a Message at the First ATM 2:

FIG. 2 is a flow diagram illustrating the procedure in which a message is input and sent at the first ATM 2 of the system (Steps A1–A9). FIGS. 3–6 show various examples of screen display on the display 34; FIG. 3 is a diagram showing an example of display requiring a confirmation whether a message for the remittance-destination customer should be sent, FIG. 4 is a diagram showing another example of display indicating that the remittance-destination customer requests for the message to be sent, and FIGS. 5 and 6 are diagrams each showing still another of examples of display when the e-mail address of the remittance-destination customer is input.

In this embodiment, as an illustrative example, an applicant for remittance (customer) makes a remittance for the remittance destination using the first ATM 2.

First of all, when the applicant for remittance makes a remittance for the remittance-destination customer, the first ATM 2 makes on the display 34 a display "Should message be sent to remittance destination?" for confirmation as to whether the message for the remittance-destination customer should be sent (Step A1).

In this system, the first-named host computer 1 may be set up in advance to make a display such that the remittance-destination customer requests every prospective applicant for remittance, which makes a remittance transaction on the remittance-destination customer's account, to input a message. If such set-up has been made, sentences saying "Remittance destination wishes to receive message. Do you send message?" as shown in FIG. 4 may be displayed.

If the applicant for remittance inputs a message (YES route of Step A1), the first ATM 2 makes a sign to start inputting a message from the display 34 and/or the voice reproducing output section 31 and then inputting the message from the applicant to the remittance-destination customer by taking a picture of the applicant using the image input section 33 and recording voice of the applicant using the voice input section 32 (Step A2). At that time, an input section with keys (FIG. 5) may be displayed on the display 34 so that a message in the form of text data also may be inputted by operating the input section with keys.

Then the first ATM 2 reproduces these input messages by the display 34 and the voice reproducing output section 31 and requests the applicant for confirmation as to whether the reproduced messages should be sent (Step A3).

If the applicant for remittance does not like the reproduced message and makes a selection to input a new message (NO route of Step A3), the procedure goes back to Step A2. Otherwise If the applicant makes an alternative selection to send the reproduced message (YES route of Step A3), the first ATM 2 sends the message to the message server 4 via Internet/Intranet 11 (Step A4).

Meanwhile, the message server 4 stores the received message in the hard disk 41 and then sends to the first ATM 2 depository information (e.g., Internet address) about the site where the message is stored (Step A5).

Upon receipt the depository information of the message from the message server 4, the first ATM 2 sends this depository information, along with the remittance information about the remittance transaction made by the applicant, to the first-named accounting host computer 1 via the exclusive line 13 (Step A6).

Then the first-named accounting host computer 1 performs a remittance process based on the received remittance information and also manages the received depository information of the message and the remittance information as well.

Subsequently, the first ATM 2 confirms whether e-mail for notification that the message from the applicant to the remittance destination has been input should be sent (Step A7).

If e-mail should be sent (YES route of Step A7), the first ATM 2 makes on the display 34 a display on which e-mail address of the remittance-destination customer is to be input, whereupon the applicant for remittance inputs the remittance-destination customer's e-mail address on a touch sensor panel, etc. (the input section with keys displayed on the display 34) (Step A8).

Alternatively, at the first-named host computer 1, the remittance-destination customer's e-mail address, together with information about the remittance-destination customer's account, may in advance registered so that, as shown in FIG. 6, the registered e-mail address of the remittance-destination customer can be displayed on the display 34 and can be checked by the applicant for remittance, thus reducing applicant's labor to input e-mail address and avoiding any mis-inputting of e-mail address.

Then the first ATM 2 sends to the input e-mail address of the remittance-destination customer e-mail saying, for example, "There is remittance message received from Mr/Ms ___. Remittance message is stored at http://www.**..**~" to notify the remittance-destination customer of the fact that the remittance message has been received and of the depository information of the remittance message (Step A9).

Otherwise if e-mail should not be sent to the remittance-destination customer (NO route of Step A7), the procedure goes to end.

If the applicant for remittance does not input a message (NO route of Step A1), the first ATM 2 sends only the remittance information to the first-named accounting host computer 1 to end the procedure.

(2) Inputting a Message at the Second-Named Personal Computer 6:

Also when the applicant makes a remittance for the remittance-destination customer at the second-named personal computer 6, the second-named personal computer 6, likewise the first ATM 2, can send the message to the remittance-destination customer.

In such event, at the second-named personal computer 6, the message is inputted using the image input section 33' and/or voice input section 32', and remittance information and the message are sent to the first-named accounting host computer 1 via Internet/Intranet 11. And when e-mail is to be sent to the applicant for remittance, the applicant inputs the remittance-destination customer's e-mail using a non-illustrated keyboard and/or mouse. The other procedure is substantially the same as inputting the message at the first ATM 2.

Figure 7:
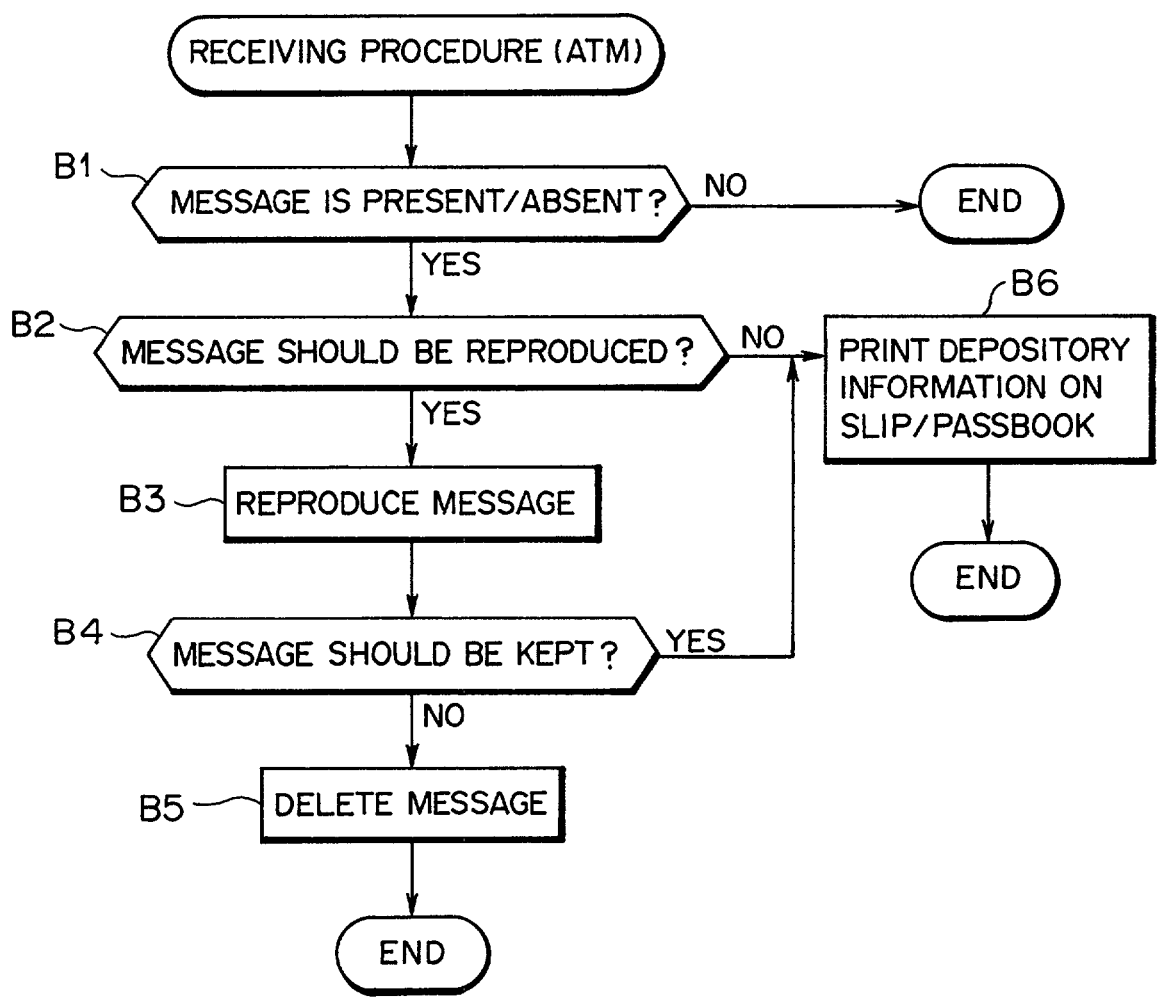
FIG. 7 is a flow diagram illustrating a succession of procedural steps for receiving a message on an ATM of the present system.

(3) Receiving and Reproducing the Message at the Second ATM 3:

FIG. 7 is a flow diagram illustrating the procedure in which the message is received at the second ATM 3 of the system (Steps B1–B6), and FIG. 8 is a diagram showing an example of screen display indicating that there has been received the message for the remittance-destination customer.

In this embodiment, when the remittance-destination customer checked the remittance using the second ATM 3 and recognized a message from the remittance source (applicant for remittance), the customer can reproduce the message using the second ATM 3 in the following manner:

Assuming that the remittance-destination customer makes various kinds of transaction procedures, such as entering the previous transactions on a passbook and drawing at least part of the deposit, the second ATM 3 examines the remittance information stored in the first-named accounting host computer 1 to thereby discriminates whether depository information of the message is added to the remittance information (Step B1).

If depository information of the message is added to the remittance information (YES route of Step B1), the second ATM 3 judges that there is received a message for the remittance-destination customer and makes on the display 34 a display, such as shown in FIG. 8, asking the remittance-destination customer for a confirmation as to whether the message should be reproduced (Step B2).

Assuming that the remittance-destination customer makes a selection not to reproduce the message using a touch sensor panel, etc. (NO route of Step B2), the second ATM 3 receives from the first-named accounting host computer 1 depository information of the message via the exclusive line 13 and prints the received depository information on a slit or a passbook (Step B6), then terminating the procedure.

Otherwise if the remittance-destination customer makes an alternative selection to reproduce the message (YES route of Step B2), the second ATM 3 receives from the first-named accounting host computer 1 depository information of the message via the exclusive line 13 and then receives the message from the message server 4 via Internet/Internet 11 based on the received depository information, whereupon the second ATM 3 reproduces the message using the display 34 and/or the voice reproducing output section 31 (Step B3).

Subsequently, the second ATM 3 makes on the display 34 a display asking the remittance-destination customer for a confirmation as to whether the message should be stored in the message server 4 (Step B4). If the remittance-destination customer makes a selection to store the message (YES route of Step B4), the second ATM 3 prints the depository information of the message on a slip or a passbook (Step B6), then terminating the procedure.

Otherwise if the remittance-destination customer makes an alternative selection not to store the message (NO route of Step B4), the second ATM 3 deletes the message on the hard disk 41 (Step B5), then terminating the procedure.

Further, if depository information of the message is not added to the remittance information (NO route of Step B1), then terminating the procedure with no further step.

At a reproducing-function-free ATM that is devoid of the display (34) or the voice reproducing output section 31, the remittance-destination customer only prints the depository information of the message on a slip or a passbook. The remittance-destination customer can receive the message later on at the first-named personal computer 5, the second-named personal computer 6 or the information terminal 7.

Figure 9:
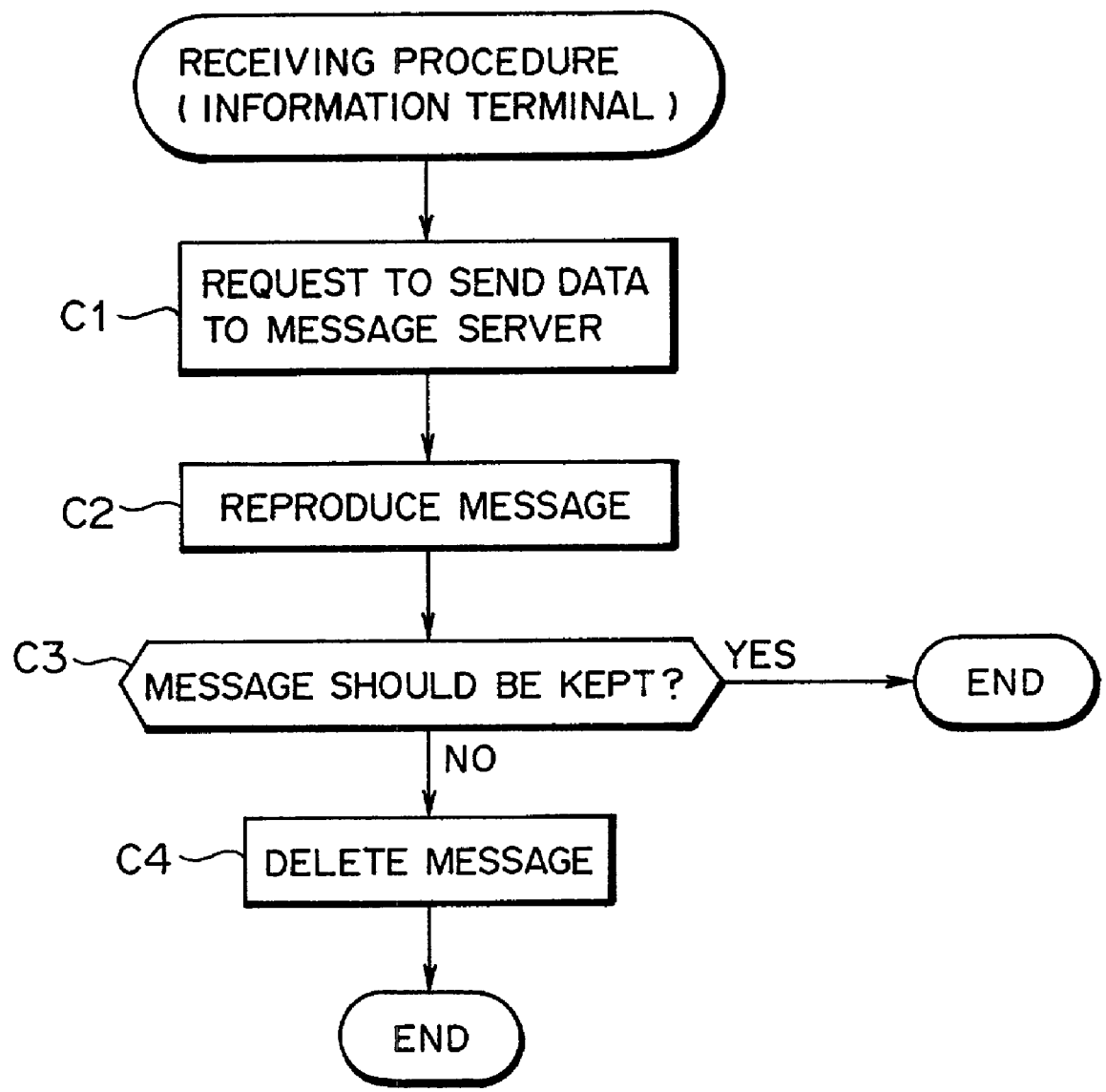
FIG. 9 is a flow diagram illustrating a succession of procedural steps for receiving a message on a personal computer of the present system.

(4) Receiving and Reproducing the Message at the First-Named Personal Computer 5:

FIG. 9 is a flow diagram illustrating the procedure in which the message is received at the first-named personal computer 5 of the system (Steps C1–C4).

For reproducing the message at the first-named personal computer 5 upon receipt of e-mail from the first ATM 2 which mail describes that there is received a message from the remittance source and the site where the remittance message is stored, the first-named personal computer 5 requests the message server 4 via Internet/Internet 11 for the message to be sent (Step C1) and reproduces the received message by the speaker 31' and/or the display 34' using a browser application, etc. (Step C2).

Then the first-named personal computer 5 makes on the display 34' a display asking the remittance-destination customer for a confirmation as to whether the message should be stored in the message server 4 (Step C3). If the remittance-destination customer makes a selection to store the message, using a keyboard and/or a mouse, for example, (YES route of Step C3), the first-named personal computer 5 terminates the procedure with no further step.

Otherwise if the remittance-destination customer makes an alternative selection not to store the message (NO route of Step C3), the first-named personal computer 5 deletes the message data stored in the hard disk 41 (Step C4), then terminating the procedure.

(5) Receiving and Reproducing the Message at the Second-Named Personal Computer 6:

Also at the second-named personal computer 6, likewise at the first-named personal computer 5, the remittance-destination customer can receive e-mail and also can receive and reproduce the message from the remittance source. And when the remittance-destination customer makes various transactions, such as checking balance of account and remittance procedure, at the second-named personal computer 6 as connected to the first-named accounting host computer 1 via Internet/-internet 11, the second-named personal computer 6, like the second ATM 3, examines the remittance information, which is managed by the first-named accounting host computer 1, to discriminate whether depository information of the message is added to the remittance information.

If depository information of the message is added to the remittance information, the second-named personal computer 6, likewise the second ATM 3 and the first-named personal computer 5, requests the remittance-destination customer for a confirmation as to whether the message should be reproduced, whereupon the second-named personal computer 6 reproduces, stores, deletes the message or undertakes other task on the message.

(6) Receiving and Reproducing the Message at the Information Terminal 7:

Assuming that the remittance-destination customer inputs the depository information of the message, which information is printed on a slip or a passbook by an ATM, at the information terminal 7, the information terminal 7, likewise the first-named personal computer 5, requests the message server 4 to send the message via Internet/internet 11 and then reproduces the received message by the speaker 31" and/or the display 34" using a browser application, etc.

Further, the information terminal 7, like the first-named personal computer 5, the second-named personal computer 6 and the second ATM, can store the received message in the hard disk 41 or delete the received message.

(7) Receiving and Reproducing the Message at the Third ATM 9:

Assume that the remittance destination is the third ATM 9 associated with the second-named accounting host computer 8 which manages transactions in a unique communicating data format different from that to be used in the first-named accounting host computer 1. If the remittance-destination customer makes various transactions, such as entering the previous transactions on a passbook and drawing at least part of the deposit, the remittance-destination customer at the third ATM 9 can receive and reproduce the received message, can delete the received message and can print the depository information of the message on a slip or a passbook, likewise in the case of the ATM 3 as described above using FIG. 7 (Steps B1–B6).

In such event, between the first-named accounting host computer 1 and the second-named accounting host computer 8, at least depository information of the message can be sent to and received from each other. This enables that the message from the applicant for remittance to the remittance-destination customer be sent also to the remittance destination associated with another accounting host computer which uses a unique communicating data format different from that to be used in either of the first- and second-named accounting host computers 1, 8.

As is understood from the foregoing description, according to the automated financial transaction system as one illustrated embodiment of the present invention, since the message input by the applicant for remittance is stored in the hard disk 41 of the message server 4 connected to Internet/internet 11, it is possible to check contents of the message at any information equipment, e.g. the information terminal 7 installed in a nearby convenience store or the customer's personal computer 5, 6 so that the remittance-destination customer can check the contents of the message from the remittance source easily without visiting a bank or other financial institution, reducing the remittance-destination customer's labor needed to checking the message contents and hence causing an improved convenience.

Further, partly since the message from the remittance source is stored in the hard disk 41 of the message server 4 connected to Internet/internet 11 and partly since the accounting computer 1, 8 manages the remittance information and only the depository information of the message, it is possible to use the existing information infrastructure, such as the existing accounting host computers 1, 8 and exclusive lines 13, 14, 15, 16, even when handling a message whose data amount is large like image (still image, moving image) data and voice data.

As another advantageous result, since transaction information (remittance information) and at least depository information of the message as well can be sent from the second-named accounting host computer 8 to the first-named accounting host computer 1, or vice versa, the applicant for remittance can send or receive a message in image and/or voice data even when making a remittance transaction for the remittance destination associated with the second-named accounting host computer 8 which manages transactions in a unique communicating data format different from that to be used in the first-named accounting host computer 1.

As still another advantageous result, since it is possible to reproduce a message from the remittance source by having access to the message from the personal computer 5, 6 or the information terminal 7 over Internet/Internet 11, the remittance-destination customer can check the contents of the message without visiting a bank or other financial institution, reducing the remittance-destination customer's labor to check the message contents and hence causing an improved convenience.

As a further advantageous result, since it is possible to send the message in image (moving image, still image) and/or voice, which is input from the image input section 33 and/or the voice input section 32, along with the remittance information during a remittance transaction, smooth communications between the remittance-destination customer and the application for remittance, thus reducing labor of the two parties.

In addition, since the remittance-destination customer is notified by e-mail that there has been input a message from the applicant for remittance, the remittance-destination customer can learn of the remittance transaction itself and the remittance message without visiting a bank or other financial institution, which would reproduce the remittance-destination customer's labor.

The present invention should by no means be limited to the illustrated embodiment, and various other changes or modifications may be suggested without departing the gist of the inventive concept.

For example, in this embodiment, the message server 4 stores the message in the hard disk 41; alternatively, the message server 4 may store the message in a storage medium which is connectable to Internet/Internet 11.

Further, in this embodiment, Internet/Internet 11 is used as a public communications network; the public communications network may be an alternative network constructed using Internet technology or other inter-network architectural technology.

What is claimed is:

1. An automated financial transaction system comprising:
    a plurality of automated teller machines (ATMs), each of said ATMs performing various financial transactions responsive to operations by customers, said ATMs comprising a first ATM having a message input section to input a message during a remittance financial transaction so that the message is transmitted to a remittance destination after the remittance financial transaction;
    a management apparatus, communicably connected with each of said ATMs via an exclusive line, managing the financial transactions performed by each said ATM; and
    a message depository, communicably connected with said first ATM via a public communications network that is separate from the exclusive line, storing the message input by said message input section of said first ATM,
    said first ATM sending said message to said message depository via said public communications network for storage, said message depository, responsive to the reception of the message, storing the message therein and sending depository information, which indicates a site where the message is stored in said message depository, to said first ATM via said public communications network; said first ATM, responsive to the reception of the depository information, sending remittance information and the associated depository information to said management apparatus via said exclusive line,
    said management apparatus, responsive to the reception of the remittance information and the associated depository information, storing the remittance information and the associated depository information to manage the message input by said message input section of said first ATM for financial transactions based upon communication with the message depository via the public communications network.

2. An automated financial transaction system according to claim 1, further comprising an information terminal communicably connected with said first ATM via said public communications network such that said first ATM notifies said information terminal of said depository information via said public communications network.

3. An automated financial transaction system according to claim 1, further comprising an information terminal communicably connected with said management apparatus via said public communications network such that said management apparatus notifies said information terminal of said depository information via said public communications network.

4. An automated financial transaction system according to claim 2, wherein when the notification of said depository information is recognized by a remittance-destination customer at said information terminal, said information terminal is responsive to a request of the remittance-destination customer to read from said message depository said message from a remittance source, based on said notified depository information, and to reproduce said message at said information terminal.

5. An automated financial transaction system according to claim 3, wherein when the notification of said depository information is recognized by a remittance-destination customer at said information terminal, said information terminal is responsive to a request of the remittance-destination customer to read from said message depository said message from a remittance source, based on said notified depository information, and to reproduce said message at said information terminal.

6. An automated financial transaction system according to claim 1, wherein said ATMs include a second ATM communicably connected with said message depository via said public communications network and having a message reproducing section for reproducing said message from the remittance source which message is stored in said message depository; and wherein when said message from the remittance source is recognized by the remittance-destination customer at said second ATM, said second ATM reads from said message depository said message from the remittance source, based on said depository information obtained from said management apparatus, and reproduces said message on said reproducing section.

7. An automated financial transaction system according to claim 1, said ATMs including a second ATM, wherein when said message from the remittance source is recognized by the remittance-destination customer at said second ATM, said second ATM obtains from said management apparatus said depository information of said message from the remittance source and prints said depository information on a passbook of the remittance-destination customer and notifies the remittance-destination customer of said depository information.

8. An automated financial transaction system according to claim 1, said ATMs including a second ATM, wherein when said message from the remittance source is recognized by the remittance-destination customer at said second ATM, said second ATM obtains from said management apparatus said depository information and prints said depository information on a slip addressed to the remittance-destination customer and notifies the remittance-destination customer of said depository information.

9. An automated financial transaction system according to claim 2, wherein said information terminal is communicably connected with said message depository of each said ATM via said public communications network and has a message reproducing function for reproducing said message from the remittance source which message is stored in said message depository, said information terminal being operable to read from said message depository said message from the remittance source, based on said notified depository information, and to reproduce the read message at said information terminal.

10. An automated financial transaction system according to claim 3, wherein said information terminal is communicably connected with said message depository of each said ATM via said public communications network and has a message reproducing function for reproducing said message from the remittance source which message is stored in said message depository, said information terminal being operable to read from said message depository said message from the remittance source, based on said notified depository information, and to reproduce the read message at said information terminal.

11. An automated financial transaction system according to claim 7, wherein an information terminal is communicably connected with said message depository of each said ATM via said public communications network and has a message reproducing function for reproducing said message from the remittance source which message is stored in said message depository, said information terminal being operable to read from said message depository said message from the remittance source, based on said notified depository information, and to reproduce the read message at said information terminal.

12. An automated financial transaction system according to claim 8, wherein an information terminal is communicably connected with said message depository of each said ATM via said public communications network and has a message reproducing function for reproducing said message from the remittance source which message is stored in said message depository, said information terminal being operable to read from said message depository said message from the remittance source, based on said notified depository information, and to reproduce the read message at said information terminal.

13. An automated financial transaction system according to claim 1, wherein an information terminal is communicably connected with said management apparatus via said public communications network and has a remittance transacting function and a message input function for inputting a message to the remittance destination during the remittance transaction; and wherein, when a message to the remittance destination is inputted by said message input function of said information terminal in response to a customer's operation, said information terminal sends said message to said message depository via said public communications network for storage and also sends remittance information and depository information of said message to said management apparatus via said public communications network for management by said management apparatus.

14. An automated financial transaction system according to claim 1, wherein if the remittance transaction made in said first ATM is for the remittance destination associated with another management apparatus which manages transactions in a unique communicating data format different from the electronic transaction format to be used by the first-named management apparatus, said first ATM sends said remittance information and said depository information of said message to said first-named management apparatus via said exclusive line, whereupon said first-named management apparatus sends said remittance information and said depository information to the second-named management apparatus.

15. An automated financial transaction system according to claim 14, wherein said ATMs include a third ATM which is to be managed by said second-named management apparatus and which is communicably connected with said message depository via said public communications network and which has a message reproducing section for reproducing said message from the remittance source which is stored in said message depository; and wherein when said message from the remittance source is recognized by the remittance-destination customer at said third ATM, said third ATM reads said message from the remittance source from message depository, based on said depository information obtained from said second-named management apparatus, for reproduction thereby.

16. An automated financial transaction system according to claim 1, wherein said message includes image data.

17. An automated financial transaction system according to claim 1, wherein said message includes voice data.

18. An automated financial system according to claim 1, wherein said public communications network is Internet.

19. An automated financial transaction system according to claim 1, wherein said public communications network includes an intranet.

20. An automated financial transaction system according to claim 1, wherein said message depository is a message server connected to said public communications network.

21. An automated financial transaction system comprising:
a plurality of automated teller machines (ATMs) performing various financial transactions responsive to operations by customers, said ATMs comprising a first ATM having a message input section to input a message during a remittance financial transaction so that the message is transmitted to a remittance destination after the remittance financial transaction;
a management apparatus, communicably connected with each of said ATMs via a first line, managing the financial transactions performed by each said ATM; and
a message depository, communicably connected with said first ATM via a second line that is separate from said first line, storing the message input by said message input section of said first ATM;
said first ATM sending said message to said message depository via said second line for storage, said message depository, responsive to the reception of the message, storing the message therein and sending depository information which indicates a site where the message is stored in said message depository, to said first ATM via said second line,
said first ATM, responsive to the reception of the depository information, sending remittance information and the associated depository information to said management apparatus via said first line,
said management apparatus, responsive to the reception of the remittance information and the associated depository information, storing the remittance information and the associated depository information to manage the message input by said message input section of said first ATM for financial transactions based upon communication with the message depository via the second line.

22. An automated financial transaction system according to claim 21, further comprising an information terminal communicably connected with said first ATM via said second line such that said first ATM notifies said information terminal of said depository information via said second line.

23. An automated financial transaction system according to claim 21, further comprising an information terminal communicably connected with said management apparatus via said second line such that said management apparatus notifies said information terminal of said depository information via said second line.

24. An automated financial transaction system according to claim 22, wherein when the notification of said depository information is recognized by a remittance-destination customer at said information terminal, said information terminal is responsive to a request of the remittance-destination customer to read from said message depository said message from a remittance source, based on said notified depository information, and to reproduce said message at said information terminal.

25. An automated financial transaction system according to claim 23, wherein when the notification of said depository information is recognized by a remittance-destination customer at said information terminal, said information terminal is responsive to a request of the remittance-destination customer to read from said message depository said message from a remittance source, based on said notified depository information, and to reproduce said message at said information terminal.

26. An automated financial transaction system according to claim 21,
wherein said ATM's include a second ATM communicably connected with said message depository and having a message reproducing section for reproducing said message from the remittance source which message is stored in said message depository; and
wherein when said message from the remittance source is recognized by the remittance-destination customer at said second ATM, said second ATM reads from said message depository said message from the remittance source, based on said depository information obtained from said management apparatus, and reproduces said message on said message reproducing section.

27. An automated financial transaction system according to claim 21, said ATMs including a second ATM, wherein when said message from the remittance source is recognized by the remittance-destination customer at said second ATM, said second ATM obtains from said management apparatus said depository information and prints said depository information on a passbook of the remittance-destination customer and notifies the remittance-destination customer of said depository information.

28. An automated financial transaction system according to claim 21, said ATMs including a second ATM, wherein when said message from the remittance source is recognized by the remittance-destination customer at said second ATM, said second ATM obtains from said management apparatus said depository information and prints said depository information on a slip of the remittance-destination customer and notifies the remittance-destination customer of said depository information.

29. An automated financial transaction system according to claim 22, wherein said information terminal is communicably connected with said message depository of each said ATM via said second line and has a message reproducing function for reproducing said message from the remittance source which message is stored in said message depository, said information terminal being operable to read from said message depository said message from the remittance source, based on said notified depository information, and to reduce the read message at said information terminal.

30. An automated financial transaction system according to claim 23, wherein said information terminal is communicably connected with said message depository of each said ATM via said second line and has a message reproducing function for reproducing said message from the remittance source which message is stored in said message depository, said information terminal being operable to read from said message depository said message from the remittance source, based on said notified depository information, and to reduce the read message at said information terminal.

31. An automated financial transaction system according to claim 27, wherein an information terminal is communicably connected with said message depository of each ATM via said second line and has a message reproducing function for reproducing said message from the remittance source which message is stored in said message depository, said information terminal being operable to read from said message depository said message from the remittance source, based on said notified depository information, and to reduce the read message at said information terminal.

32. An automated financial transaction system according to claim 28, wherein an information terminal is communicably connected with said message depository of each said ATM via said second line and has a message reproducing function for reproducing said message from the remittance source which message is stored in said message depository, said information terminal being operable to read from said message depository said message from the remittance source, based on said notified depository information, and to reduce the read message at said information terminal.

33. An automated financial transaction system according to claim 21,
wherein an information terminal is communicably connected with said management apparatus via said second line and has a remittance transaction unit and a message input function for inputting a message to the remittance destination during the remittance transaction; and
wherein, when a message to the remittance destination is inputted by said message input function of said information terminal in response to a customer's operation, said information terminal sends said message to said message depository via said second line for storage and also sends remittance information and depository information of said message to said management apparatus for management thereby.

34. An automated financial transaction system according to claim 21, wherein the remittance transaction made in said first ATM is for the remittance destination associated with another management apparatus which manages transactions in a unique communicating data format different from the electronic transaction formation to be used by the first-named management apparatus via said first line, whereupon said first-named management apparatus sends said remittance information and said repository information to the second-named management apparatus.

35. An automated financial transaction system according to claim 34,
wherein said ATMS include a third ATM which is to be managed by said second-named management apparatus and which is communicably connected with said message depository via said second line and which has a message producing section for reproducing said message from the remittance source which is stored in said message depository; and
wherein when said message from the remittance source is recognized by the remittance-destination customer at said third ATM, said third ATM reads said message from the remittance source from message depository, based on said depository information obtained from said second-named management apparatus, for reproduction thereby.

36. An automated financial transaction system according to claim 21, wherein said message includes image data.

37. An automated financial transaction system according to claim 21, wherein said message includes voice data.

38. An automated financial transaction system according to claim 21, wherein said second line is Internet.

39. An automated financial transaction system according to claim 21, wherein said second line is Intranet.

40. An automated financial transaction system according to claim 21, wherein said message depository is a message server connected to said second line.

41. An automated financial transaction method, comprising:
inputting a message for a remittance destination during a remittance financial transaction at an automated teller machine (ATM) to perform a financial transaction;
sending the message for storage from the ATM to a message depository via a public communications network, said message depository, responsive to the reception of the message, storing the message therein; and
sending depository information which indicates a site where the message is stored in the message depository, to the ATM via said public communications network, said ATM, responsive to the reception of the depository information, sending remittance information and the associated depository information to a management apparatus via an exclusive line that is separate from the public communications network, the management apparatus, responsive to the reception of the remittance information and the associated depository information, storing the remittance information and the associated depository information to manage the message input by said message input section of said first ATM for financial transactions based upon communication with the message depository via the public communications network.

* * * * *

UNITED STATES PATENT AND TRADEMARK OFFICE
CERTIFICATE OF CORRECTION

PATENT NO. : 7,191,152 B1 Page 1 of 1
APPLICATION NO. : 09/447658
DATED : March 13, 2007
INVENTOR(S) : Satoshi Mukogawa It is certified that error appears in the above-identified patent and that said Letters Patent is hereby corrected as shown below:

Col. 20, line 10, delete "ATM's" and insert --ATMs--.

Col. 21, line 40, delete "ATMS" and insert --ATMs--.

Signed and Sealed this

Nineteenth Day of June, 2007

JON W. DUDAS
*Director of the United States Patent and Trademark Office*